United States Patent
Romaszko et al.

(10) Patent No.: US 11,767,698 B2
(45) Date of Patent: Sep. 26, 2023

(54) PINCH DETECTION DURING MOTOR RESTART

(71) Applicant: Aptiv Technologies Limited, St. Michael (BB)

(72) Inventors: Mateusz Romaszko, Cracow (PL); Piotr Maj, Wegrzce Wielkie (PL)

(73) Assignee: Aptiv Technologies Limited, St. Michael (BB)

( * ) Notice: Subject to any disclaimer, the term of this patent is extended or adjusted under 35 U.S.C. 154(b) by 61 days.

(21) Appl. No.: 17/519,392

(22) Filed: Nov. 4, 2021

(65) Prior Publication Data
US 2022/0154512 A1 May 19, 2022

(30) Foreign Application Priority Data
Nov. 17, 2020 (EP) .................................. 20208149

(51) Int. Cl.
*E05F 15/41* (2015.01)
*E05F 15/695* (2015.01)
(Continued)

(52) U.S. Cl.
CPC ............ *E05F 15/41* (2015.01); *E05F 15/695* (2015.01); *E05F 15/697* (2015.01); *H02H 7/0851* (2013.01); *E05Y 2900/55* (2013.01)

(58) Field of Classification Search
CPC .............................. H02H 7/0851; E05F 15/41
See application file for complete search history.

(56) References Cited

U.S. PATENT DOCUMENTS 4,641,067 A    2/1987  Iizawa et al.
5,399,950 A *  3/1995  Lu .................... H02H 7/0851
                                                  318/434
(Continued)

FOREIGN PATENT DOCUMENTS

CN    101220724    7/2008
CN    202899882    4/2013
(Continued)

OTHER PUBLICATIONS

"Extended European Search Report", EP Application No. 20208153.5, dated May 11, 2021, 7 pages.
(Continued)

*Primary Examiner* — Rina I Duda
(74) *Attorney, Agent, or Firm* — Sawtooth Patent Group PLLC

(57) ABSTRACT

The pinch detector includes a first portion that, in a first situation in which the member is being closed in a first closing movement but is stopped in an intermediate position not completely closed, obtains a reference value of a measured physical quantity of the motor, when braking the motor is ordered to stop the member, said reference value representing the physical quantity of the motor just before motor braking; a second portion that, in a second situation following the first situation and in which the member is moved in a second closing movement from said intermediate position not completely closed, compares current values of the measured physical quantity of the motor to a threshold value depending on said reference value in order to detect a pinch at closing member based on a comparison result.

20 Claims, 10 Drawing Sheets

(51) Int. Cl.
   *E05F 15/697* (2015.01)
   *H02H 7/085* (2006.01)

(56) References Cited

U.S. PATENT DOCUMENTS

| | | | |
|---|---|---|---|
| 5,734,245 A | | 3/1998 | Terashima et al. |
| 5,977,732 A | | 11/1999 | Matsumoto |
| 6,051,945 A | * | 4/2000 | Furukawa ............ H02H 7/0851 318/264 |
| 6,208,102 B1 | * | 3/2001 | Kikuchi .................. E05F 15/40 49/138 |
| 6,239,610 B1 | | 5/2001 | Knecht et al. |
| 6,274,947 B1 | | 8/2001 | Terashima |
| 6,362,584 B1 | | 3/2002 | Rogovin |
| 6,573,677 B2 | * | 6/2003 | Gerbetz ............... H02H 7/0851 318/434 |
| 6,633,147 B2 | * | 10/2003 | Gerbetz .................. E05F 15/41 318/434 |
| 6,794,837 B1 | | 9/2004 | Whinnery et al. |
| 8,620,531 B2 | | 12/2013 | Morawek |
| 10,047,553 B2 | | 8/2018 | Shibata |
| 10,337,230 B2 | | 7/2019 | Kigoshi et al. |
| 11,454,061 B2 | | 9/2022 | Fujita |
| 11,572,728 B2 | | 2/2023 | Kim et al. |
| 11,581,829 B2 | | 2/2023 | Romaszko et al. |
| 2002/0101210 A1 | | 8/2002 | Boisvert et al. |
| 2002/0190680 A1 | * | 12/2002 | Gerbetz ............... H02H 7/0851 318/445 |
| 2003/0051555 A1 | | 3/2003 | Fukumura et al. |
| 2004/0079867 A1 | | 4/2004 | Gallo et al. |
| 2005/0187688 A1 | | 8/2005 | Bigorra et al. |
| 2006/0267453 A1 | | 11/2006 | Sugiura |
| 2006/0293821 A1 | | 12/2006 | Takahashi |
| 2008/0079379 A1 | | 4/2008 | Odland et al. |
| 2009/0056385 A1 | | 3/2009 | Maekawa |
| 2010/0039057 A1 | | 2/2010 | Tsai |
| 2011/0210755 A1 | | 9/2011 | Ogawa |
| 2011/0265381 A1 | | 11/2011 | Guarnizo |
| 2012/0032618 A1 | | 2/2012 | Stoeger |
| 2014/0173984 A1 | | 6/2014 | Schlesiger et al. |
| 2014/0239867 A1 | | 8/2014 | Bessho et al. |
| 2017/0113652 A1 | | 4/2017 | Tokudome |
| 2020/0018111 A1 | | 1/2020 | Akbarian et al. |
| 2020/0249752 A1 | | 8/2020 | Parshionikar |
| 2023/0062859 A1 | | 3/2023 | Gowda |

FOREIGN PATENT DOCUMENTS

| | | |
|---|---|---|
| DE | 19601359 | 7/1997 |
| DE | 102009028914 | 3/2011 |
| DE | 102012011117 | 12/2013 |
| EP | 0692856 | 1/1996 |
| EP | 2175330 | 4/2010 |

OTHER PUBLICATIONS

"Extended European Search Report", EP Application No. 21204569.4, dated Mar. 21, 2022, 8 pages.
"Extended European Search Report", EP Application No. 20208151.9, dated Apr. 28, 2021, 7 pages.
"Extended European Search Report", EP Application No. 20208149.3, dated Apr. 30, 2021, 6 pages.
"Extended European Search Report", EP Application No. 20208150.1, dated Apr. 30, 2021, 7 pages.
"Extended European Search Report", EP Application No. 20208152.7, dated May 3, 2021, 6 pages.
"Foreign Office Action", EP Application No. 20208151.9, dated May 31, 2023, 4 pages.

* cited by examiner

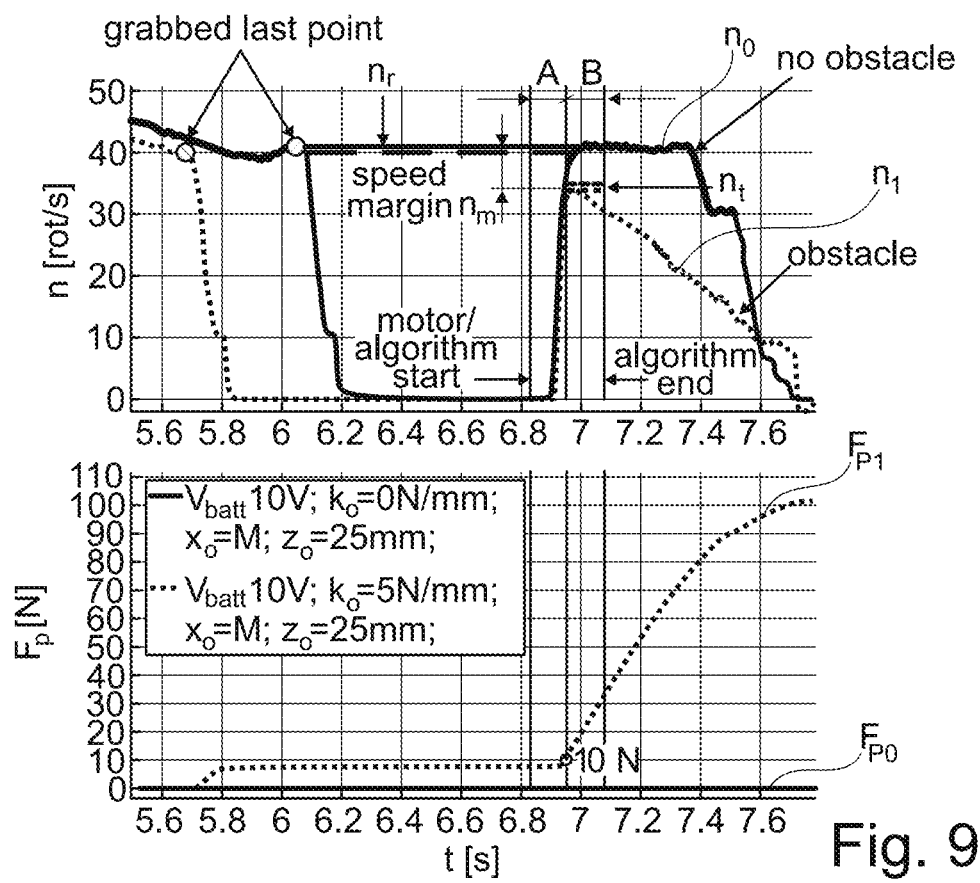
Fig. 9
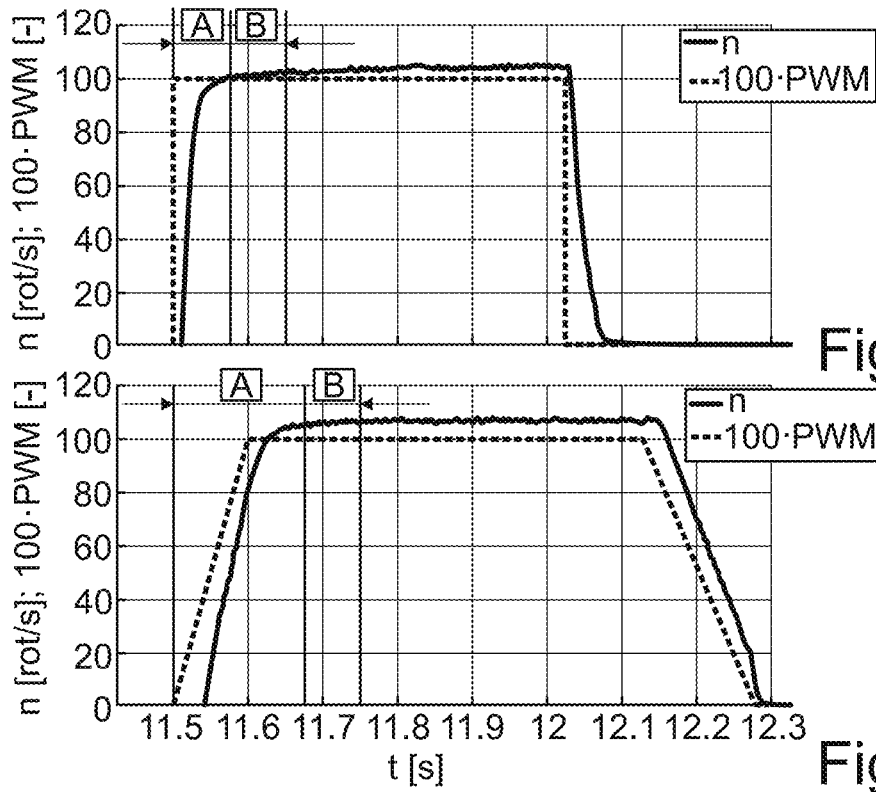
Fig. 10a
Fig. 10b

PINCH DETECTION DURING MOTOR RESTART

CROSS-REFERENCE TO RELATED APPLICATION

This application claims priority to European Patent Application Number 20208149.3, filed Nov. 17, 2020, the disclosure of which is hereby incorporated by reference in its entirety herein.

BACKGROUND

The present disclosure relates to the field of movable members actuated by a motor, especially members such as power windows, sliding doors or sliding roofs in vehicles, which are provided with an anti-pinch detector to provide protection against injuries. More specifically, the present disclosure relates to a pinch detector suitable to detect a pinch at a closing member, a control apparatus for controlling the closing member actuated by a motor, and a method to detect a pinch at a closing member. The closing member is a member (such as a window, a door, a roof, a shutter, etc.) that can move (open and close), for example in translation, between a closed position where the member closes an open position where the member is removed from the opening.

Power windows (i.e., windows activated by an electric motor) are getting very popular nowadays, even in low-range vehicles.

It happens that children try to put their neck or hands out through the window. If anyone operates the window switch to close the window at the same time, it may cause suffocation or injuries to the child. The risk also arises in case of power windows which are programmed to operate without even the need to press the switch, for example when a global closing function is activated.

Windows are moved with clamping forces of up to 350 N. This means that a thin glass plate of only about 8 mm thickness can press up to 35 kg (e.g. onto a child's hand or head). It takes only 98 N to suffocate or injure a small child. To avoid such mishaps, an anti-pinch technology has been developed.

The anti-pinch technology of a power window has to meet standards for example issued by the European Union and/or the United States. According to known standards, the maximum force a power window is allowed to exert on any object is 100 N and compliance with this limit must be monitored and enforced in a range of 4 mm to 200 mm minimum from the top window frame, as shown in FIG. 1. It is also important to deactivate the anti-pinch algorithm immediately before the window seal is reached (distance 4 mm from top seal), so that the window can close completely. In addition, to avoid overload and damage to the window motor, blocking must not last too long.

Document US 2014/239867 A1 discloses a pinch detection apparatus for a member actuated by a motor which comprises a reference data storage portion calculating load data on the basis of a rotation speed of the motor and an environmental temperature.

Document US 2003/051555 A1 discloses a pinch detection system based on the calculation of reference motor torque using voltage and speed measurements. To this end, it requires at least one dedicated speed sensor, such as an encoder or a Hall effect sensor, that determines the rotational speed of the motor. A voltage sensor provides information to a force calculator which calculates the motor force. A difference between an actual force and a reference force can thus be determined. A pinch condition is indicated if the force difference exceeds a predetermined threshold.

Document U.S. Pat. No. 6,239,610 B1 discloses a solution based on the voltage induced in the armature motor of the electric drive system used for moving the window.

Lots of known solutions require an additional equipment such as force or speed sensors, which involves an additional cost, require more space in a relatively constrained environment and does not allow to increase the reliability of the entire system.

Document CN101220724A discloses an anti-pinch device for a power window requiring no additional sensor. An armature current signal is obtained, and it is judged whether or not the motion of the window is obstructed by an obstacle according to the current and using a constant current threshold.

The most difficult scenario for pinch detection is detection of an obstacle (e.g. a body part such as a finger, hand, arm, etc.) that is squeezed as soon as the motor starts. FIG. 2 schematically illustrates this window movement scenario. In a step 1, the window is completely closed. Then, the window is opened. In a next step 2, the window is closed but stopped in an intermediate position not completely closed, as shown in a step 3. In this step 3, when the window is stopped temporarily in its intermediate position not completely closed, an object (obstacle) is placed in the space left between the window and the window frame of the door. The object is placed in such a way that, when the window starts closing again, in a step 4, it is squeezed immediately by the window. At this moment, during the motor start-up, the motor actuating the window has an additional load due to the presence of the object that is squeezed.

There are no unambiguous and reliable ways to capture characteristic changes of physical values of the motor, such as the armature current flowing in an armature of the motor or the motor speed, during the motor start-up (step 4 in FIG. 2), when transient phenomena dominate. During the motor start-up, the motor operates in transient state: the motor armature current and/or motor speed change dynamically and in an unpredictable manner. These changes depend on factors such as supply voltage, temperature, and window position (different gasket resistance). Therefore, pinch detection in such conditions is very difficult. Detecting a pinch in a transient state of the motor, typically in a situation in which, after being stopped temporarily in an intermediate position not completely closed, the window starts closing again, in order to avoid exceeding the limit value of pinch force (e.g. 100 N), is a very challenging task.

Accordingly, there is a need for improving existing anti-pinch solutions in order to at least partially overcome the aforementioned issues and drawbacks.

SUMMARY

The present disclosure concerns a pinch detector suitable to detect a pinch at a closing member actuated by a motor equipped with a measuring circuit to measure a physical quantity of the motor, including a first portion that, in a first situation in which the member is being closed in a first closing movement but is stopped in an intermediate position not completely closed, obtains a reference value of the measured physical quantity of the motor, when braking the motor is ordered to stop the member, said reference value representing the physical quantity of the motor just before motor braking; a second portion that, in a second situation following the first situation and in which the member is moved in a second closing movement from said intermediate position not completely closed, compares current values of the measured physical quantity of the motor to a threshold value depending on said reference value in order to detect a pinch at the closing member based on a comparison result.

The present pinch detector can efficiently detect the occurrence of a pinch at the closing member in the following member movement scenario: the member is being closed but is temporarily stopped in an intermediate position not completely closed, then it is completely closed. When the member is stationary in its intermediate position not completed closed, an obstacle is likely to be placed in the space left between the member and the member frame. The pinch detector determines a reference value of the measured physical quantity of the motor, before braking to stop the member or when the motor has just started braking to stop the member, and uses this reference value to detect the occurrence of a pinch when the motor restarts, after stopping the member in its position not completely closed, in order to completely close the member. The reference value is grabbed (obtained) by the pinch detector in response to a command (or signal, or information) to stop the member. It is then used in pinch detection when the member starts closing again from the intermediate position not completely closed.

The pinch detection is thus based on measured data when the motor brakes to stop the member in the intermediate position not completely closed. This measured data defines a reference value or a reference level of the physical quantity of the motor. This reference value (or level), then used in pinch detection, is updated each time the member stops in an intermediate position.

Such an approach to detect a pinch at a closing member is very simple, fast, and robust with respect to various external conditions (supply voltage, obstacle stiffness, etc.).

Advantageously, the second portion compares the current values of the measured physical quantity to the threshold value during a motor start-up operation.

The first portion can obtain the reference value of the measured physical quantity of the motor by requesting a last value of the measured physical quantity upon reception of a braking information, when the motor has just started braking The first portion can determine the threshold value by adding to or by subtracting from the reference value, a margin value that is equal to a correction factor multiplied by said reference value.

The first portion can use a correction factor that is set to a value between 0,1 and 0,3.

In a first variant, the physical quantity of the motor is motor current, such as an armature current flowing through an armature winding of the motor, and the second portion starts detection of a pinch immediately when the motor starts after being stopped.

In a second variant, the physical quantity of the motor is a motor speed, and the second portion starts detection of a pinch after a predetermined time duration from a motor starting time point, said predetermined time duration corresponding to a first period of time in the motor starting during which the motor speed increases.

The present disclosure also concerns a control apparatus for controlling a closing member actuated by a motor equipped with a measuring circuit to measure a physical quantity of the motor, including a pinch detector as previously defined, and a portion that generates a control signal to control at least one of the two actions of stopping the movement of the member and reversing the direction of movement of the member when a pinch is detected.

The present disclosure also concerns a system including a closing member; a motor for activating the member; a measuring circuit to measure a physical quantity of the motor; a control apparatus as above defined.

The present disclosure also concerns a method to detect a pinch at a closing member actuated by a motor equipped with a measuring circuit to measure a physical quantity of the motor, including, in a first situation in which the member is being closed in a first closing movement but is stopped in an intermediate position not completely closed, a step of obtaining a reference value of the measured physical quantity of the motor, when braking the motor is ordered to stop the member, said reference value representing the physical quantity of the motor just before motor braking; and in a second situation following the first situation and in which the member is moved in a closing movement from said intermediate position not completely closed, a step of comparing current measured values of the physical quantity of the motor to a threshold value depending on said reference value in order to detect a pinch at the closing member based on a comparison result.

Advantageously, the current values of the measured physical quantity are compared to the threshold value during a motor start-up operation.

In the first step, the reference value of the measured physical quantity of the motor can be obtained by obtaining a last value of the measured physical quantity, upon reception of a braking information, when the motor has just started braking.

The threshold value can be determined by adding to or by subtracting from the reference value, a margin value that is equal to a correction factor multiplied by said reference value.

The present disclosure also concerns a non-transitory computer readable medium including program instructions for causing a processor to execute the method as previously defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

FIG. 9 shows the evolution of the motor speed over time in a scenario of closing the window, with and without obstacle, in a second variant of Embodiment 1.

FIGS. 10a and 10b represent two different motor start-up strategies.

DETAILED DESCRIPTION

The present disclosure relates to pinch detection to detect a pinch at a closing member 1 actuated by a motor 2 (for example a power window in a vehicle) and is more precisely dedicated to pinch detection during a second closing movement of the member 1, during the motor start-up after the member has been moved in a first closing movement, and then stopped in an intermediate position not completely closed.

The member 1 is a movable (opening and closing) member such as a window, a door, a roof, a shutter, etc., that can move typically in translation between a closed position where the member 1 closes an opening area and an open position where the member 1 is removed from the opening area.

In the present description, the "transient state" of the motor refers to the period of time when one or more physical values (such as motor current and motor speed) of the motor are changing rapidly during the motor start-up, before reaching a steady state. Typically, in transient state, the motor armature current and/or the motor armature shaft speed are changing rapidly. Normally, the transient state is followed by a steady state in which the motor current and the motor speed are almost constant (small fluctuations may be observed but no dynamic changes). Between the transient state and the steady state, the motor can operate in a semi-steady state in which its physical values change less rapidly but are not steady yet.

Figure 1:
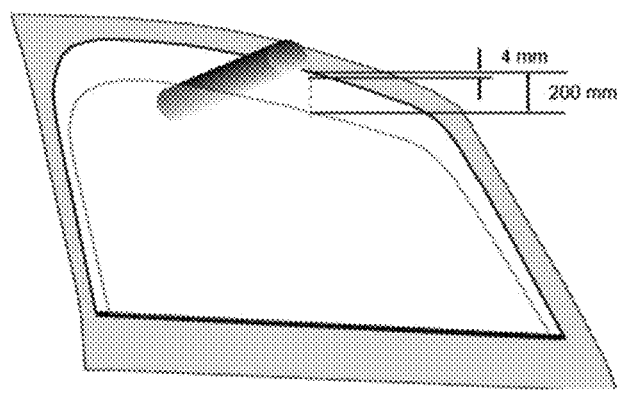
FIG. 1 shows an obstacle placed in a space left between a window and a door frame, in a vehicle, and a range of vertical positions in which compliance with a limit of pinch force defined by standards must be monitored.
Figure 2:
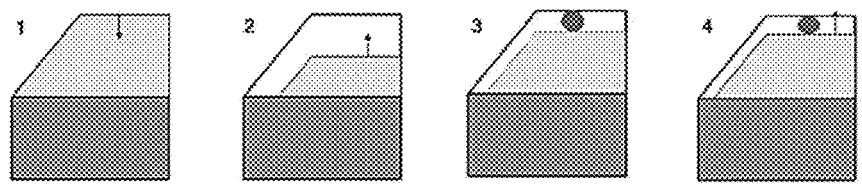
FIG. 2 represents a window movement scenario in which an obstacle is squeezed.
Figure 3A:
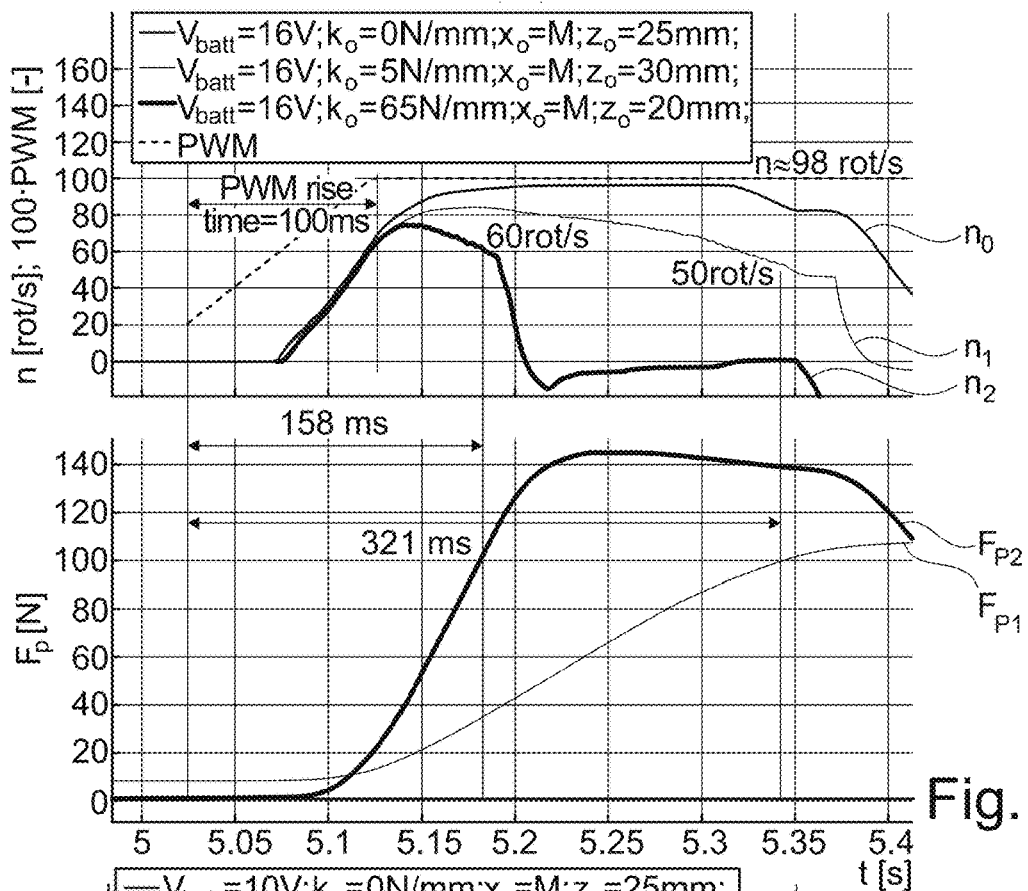
FIGS. 3a and 3b show graphs representing motor speed and pinch force, in transient states, when the motor restarts during a closing operation of the window, in different external conditions, with or without obstacles, without pinch detection.
Figure 3B:
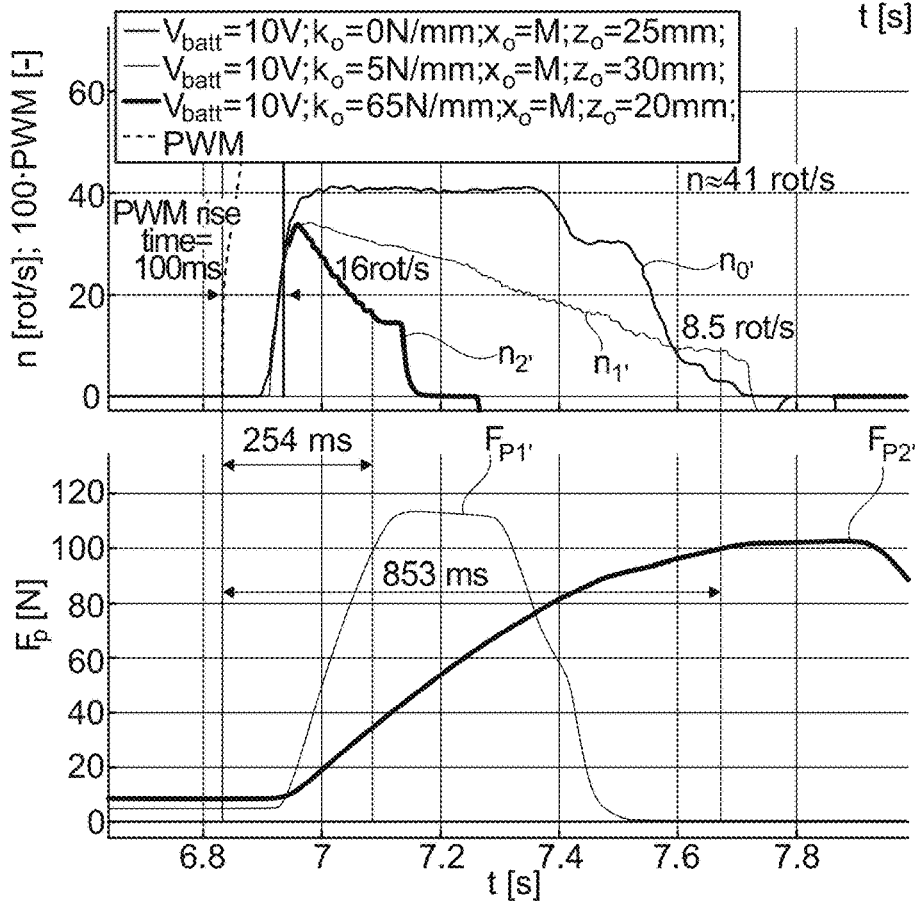
Figure 4:
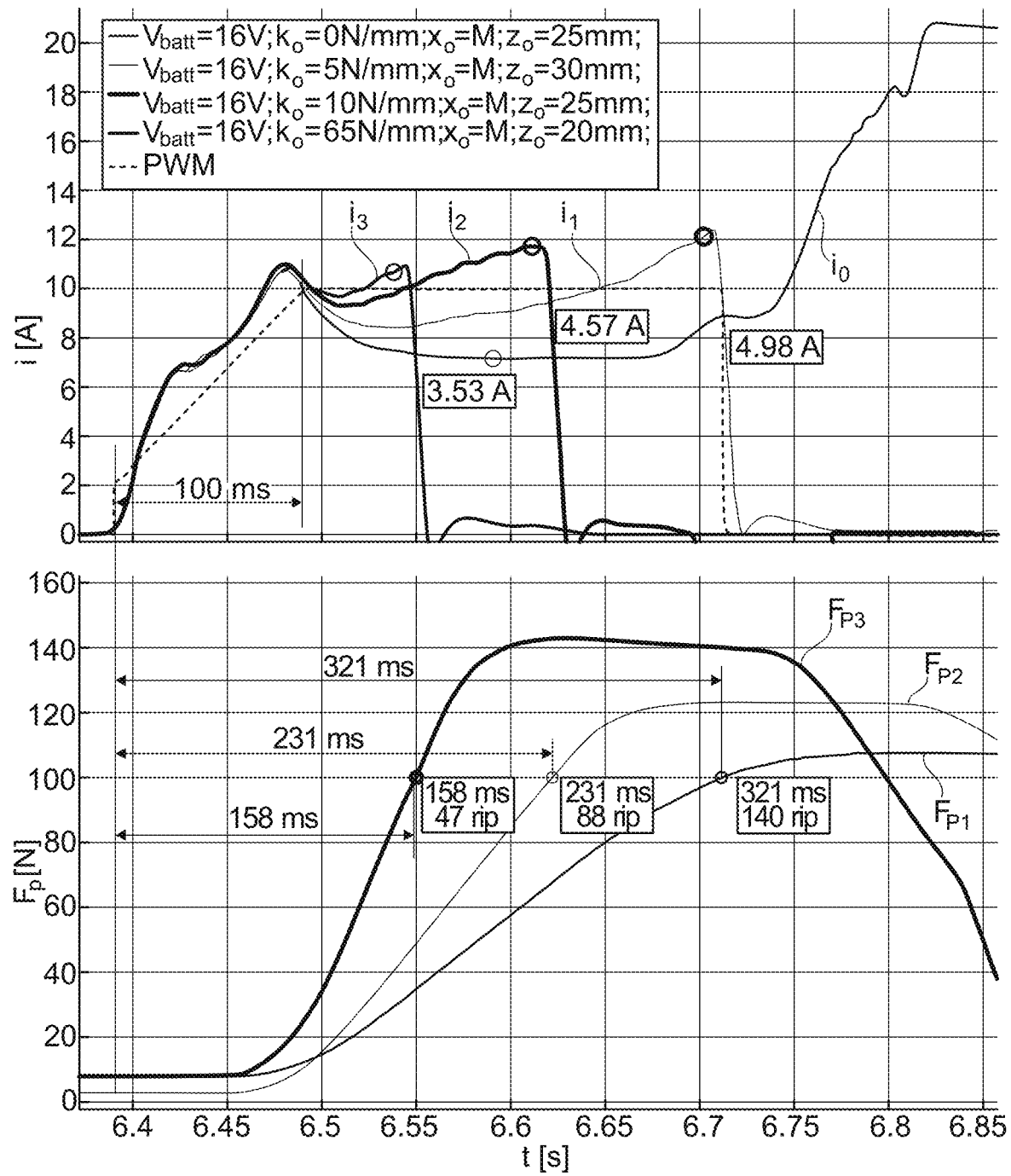
FIG. 4 shows graphs representing motor armature current and pinch force, in transient state or in semi-steady state, when the motor restarts during a closing operation of the window, in different external conditions, with or without obstacles, without pinch detection.

FIGS. 3a and 3b represent the evolution over time of the motor speed of a motor actuating a member like a window in a vehicle, in transient state or semi-steady state, according to different scenarios (explained below), given as illustrative examples, without pinch detection. FIG. 4 represent the evolution over time of the motor armature current of a motor actuating a member like a window in a vehicle, according to different scenarios (explained below), given as illustrative examples, without pinch detection. All these scenarios concern a member, e.g. a power window in a vehicle, actuated by a motor in the following circumstances: after being stopped temporarily in an intermediate position not completely closed, the window starts closing. Physical quantities (or physical values) of the motor are measured and represented in FIGS. 3a, 3b and 4, when the window starts closing from its intermediate position not completely closed. At this moment, the motor is in transient state or semi-steady state.

Each of FIGS. 3a and 3b illustrates three different cases (or scenarios). In the first and second cases, an obstacle is placed in the space left between the window and the upper window frame, in the middle between front and rear window frame, when the window is temporarily stopped. The third case is without obstacle. In each FIG. 3a, 3b, the upper graph represents the evolution over time of the motor armature shaft rotational speed "n" and the lower graph represents the evolution over time of the pinch force "Fp" of the squeezed object (obstacle), when the window starts closing from its stop position not completely closed. In FIG. 3a, a battery of 16 V ($V_{batt}$=16 V) is used to supply power to the motor. In the first and second cases (referenced as $n_1$, $F_{P1}$ and $n_2$, $F_{P2}$ in the FIG. 3a) the obstacle stiffness $k_o$ is respectively 5 N/mm and 65 N/mm and the third case (referenced as $n_0$) is without obstacle ($k_o$=0 N/mm). In FIG. 3b, three analogous scenarios (referenced as $n_0'$, $n_1'$, $F_{P1}'$ and $n_2'$, $F_{P2}'$) are represented but a battery of 10 V ($V_{batt}$=10 V) is used to supply power to the motor. In each of FIGS. 3a, 3b, in a first stage of squeezing the obstacle, the motor speed $n_1$ ($n_1'$), $n_2$ ($n_2'$) increases and reaches a maximal value. In the given examples, this first stage lasts about 100 ms and corresponds to a rise time of a duty cycle of a PWM (Pulse-width modulation) electrical signal for supplying power to the motor, that has a fixed frequency and a variable duty cycle. Then, in a second stage, the motor speed starts decreasing—$n_1$ ($n_1'$), $n_2$ ($n_2'$)—in case that an obstacle is squeezed or becomes almost steady—$n_0$ ($n_0'$)—without obstacle. During the first stage (about 100 ms), all three cases (with and without obstacle) look very similar. The differences appear only in the second stage after reaching the maximal speed value.

In reference to the lower graphs of FIG. 3a, for a battery voltage of 16 V, the pinch force $F_P$ of 100 N is reached when the motor speed has decreased down to 60 and 50 rot/s (rotations per second) during 158 ms and 321 ms respectively for an obstacle stiffness of 5 and 65 N/mm. In reference to the lower graph of FIG. 3b, a similar situation can be observed for a 10 V battery. A pinch force $F_P$ of 100 N is reached, when the motor speed has decreased down to 16 and 8.5 rot/s during 254 ms and 853 ms respectively for an obstacle stiffness of 5 and 65 N/mm.

Among the different situations given as illustrative examples in FIGS. 3a and 3b, the most critical situation for pinch detection is for a battery voltage of 16 V and an obstacle stiffness $k_o$ of 65 N/mm. Indeed, in that case, the window moves with the highest speed and the obstacle is the stiffest, which involves that the time for pinch detection is the shortest. Actually, the time elapsed from motor start to compression of the obstacle with a pinch force equal to 100 N is 158 ms. Considering that no pinch detection can be done reliably during the first stage of speed increase lasting about 100 ms, it means that the time to detect a pinch is only 58 ms, in the given example.

FIG. 4 illustrates the transient state or semi-steady state of a motor actuating a power window in a vehicle, in the same window movement scenario as previously explained, in four other cases (explained below). The upper graph shows the evolution of the motor armature current density "i" over time, and the lower graph represents the evolution of the pinch force "$F_p$" of a squeezed object (obstacle) over time, when the window starts closing from its intermediate position not completely closed. In all four cases, the battery voltage for supplying the motor is 16 V. In three cases, obstacles with the respective stiffnesses of 5, 10 and 65 N/mm are placed in the space left between the window and the upper window frame, in the middle between front and rear window frame. In one case, the window is closed without any obstacle ($k_o=0$ N/mm).

The upper graph of FIG. 4 shows an increase of the motor current $i_1$, $i_2$, $i_3$ when squeezing the obstacle with the different stiffnesses of 5, 10 and 65 N/mm, and a neutral current level io. corresponding to the average motor current ($i_0$) without obstacle. This neutral level corresponds more precisely to the situation when there is a closing movement without any obstacle (or external load). It is calculated as an average value of current density "i" during some time interval when transient or semi-steady state finishes. In the example of FIG. 4, the vehicle window transient state finishes approximately 300 ms after the window starts moving. This value is determined experimentally. Some measurements of calibration are necessary to analyze the system behavior. The current increase with respect to this neutral level ($i_0$) is 3.53 A, 4.57 A, 4.98 A for the respective stiffnesses of 65, 10, 5 N/mm. The lower graph of FIG. 4 represents the evolution over time of the pinch force ($F_{P1}$, $F_{P2}$, $F_{P3}$) in the three cases with an obstacle. The pinch force rise time from the time point of starting the motor to the time point of reaching a pinch force of 100 N is indicated in the lower graph of FIGS. 4: 158, 231 and 321 ms for obstacle stiffnesses of 65, 10, 5 N/mm respectively. The evolution over time of the duty cycle of the PWM (Pulse-width modulation) signal for supplying power to the motor 2 is also represented in the upper graph.

The experiments illustrated in FIG. 4 clearly show that, in the first stage of starting the motor and for a duration of about 100 ms, all four transient states (with or without obstacle) are almost identical. This period of time corresponds to the rise time of the PWM duty cycle. The differences appear only after this first stage of starting the motor. However, in the worst situation, it is less than 60 ms before the pinch force reaches the limit value of 100 N.

The present method allows to achieve detection of a pinch (i.e. a squeezed obstacle) at a closing member 1 actuated by a motor 2, in the following situation: in a first closing movement, the member 1 is stopped in an intermediate position not completely closed, then, in a second closing movement, a pinch can be detected based on a reference value of the motor speed or motor current density grabbed before the member 1 starts braking to be stopped in the first closing movement. In other words, the present disclosure is dedicated to the detection of a pinch when the motor starts to close the member 1 after the member has been moved in a first closing movement and (temporarily) stopped in a position not completely closed. Typically, the pinch detection is performed during the second closing movement, during the motor start-up operation. For example, the pinch detection can be carried out in the scenarios described with reference to FIGS. 3a, 3b and 4, before reaching the pinch force limit of 100 N.

For a first upward (or closing) movement, the reference value can be taken from a recorded pattern of motor speed or motor current density during a closing movement. A pattern recording process can be performed at a calibration step.

For example, the closing member 1 is a power window in a vehicle. However, the present disclosure is not limited to a power window but can apply to other types of closing members (e.g. sliding door or sliding roof in a vehicle, sliding door of a garage, etc.).

In that case, the present method for pinch detection allow to detect a pinch only in an upward movement of the window. In a first upward movement, the window is stopped in any position not completely closed and, before the window starts braking, the reference value of motor speed or motor current density is grabbed. Then, in a second upward movement, pinch can be detected because the reference value in transient or semi-steady state is known. The window may take any initial position at the beginning of the second upward movement.

Figure 5:
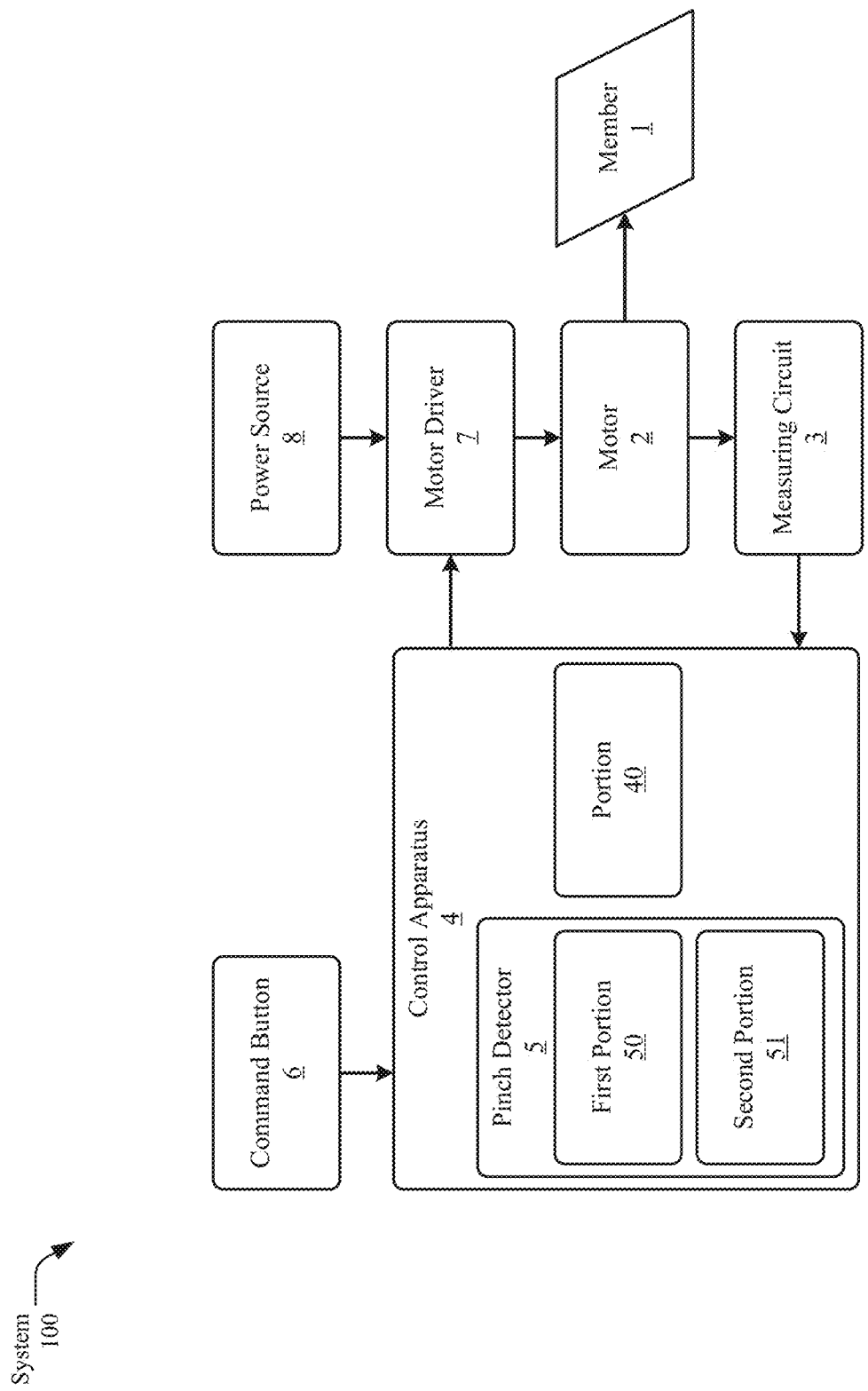
FIG. 5 represents schematically a system for pinch detection, according to a particular example.

FIG. 5 represents a system 100 including the opening and closing member 1 (e.g. a power window in a vehicle), a motor 2 for actuating the member 1, a measuring circuit 3 (or measuring device, or sensor) to measure a physical quantity of the motor 2, a control apparatus 4 for controlling the motor 2, a pinch detector 5 for pinch detection at the closing member 1.

The pinch detector 5 can be part of the control apparatus 4. In operation, it implements the method (or algorithm) of pinch detection, described below, to detect a pinch at the closing member 1.

A user interface means can also be provided to enter user commands, for example to stop or move the member. It can include for example a window command button 6 that can be pressed up to move up the window 1 or pressed down to move down the window 1.

The motor 2 is equipped with the measuring circuit 3 to measure a physical quantity (or physical value) of the motor 2, for example a motor current, such as an armature current flowing through an armature winding of the motor, or a motor speed, or a motor position. The measuring circuit 3 measures values of the physical quantity at successive times, for example with a predetermined measurement frequency. The successive points (or values) of the physical quantity are sent to the control apparatus 4.

The control apparatus 4 controls the operation of the motor 2. It has a portion 40 that generates a control signal to control the movement of the member 1. For example, when a pinch is detected, the portion 40 generates a control signal to stop the member 1 and/or reverse the direction of movement of the member 1.

The system 100 also includes a power source 8, e.g. an electrical battery, for supplying power to the motor 2, and a motor driver 7. In some embodiments, the motor driver 7 has a PWM controller to control supplying power as a PWM signal to the motor 2. In that case, electrical power is supplied to the motor 2 as a PWM signal characterized by a frequency and a PWM duty cycle. The PWM duty cycle can vary during the motor operation. For example, as well known by the person skilled in the art, the PWM duty cycle increases from an initial value (0% or more) to a final value, that is usually 100% (but can be less than 100%), when the motor starts. Then, it is stationary when the motor 2 operates at full speed and it finally decreases before stopping.

Embodiment 1

Figure 6:
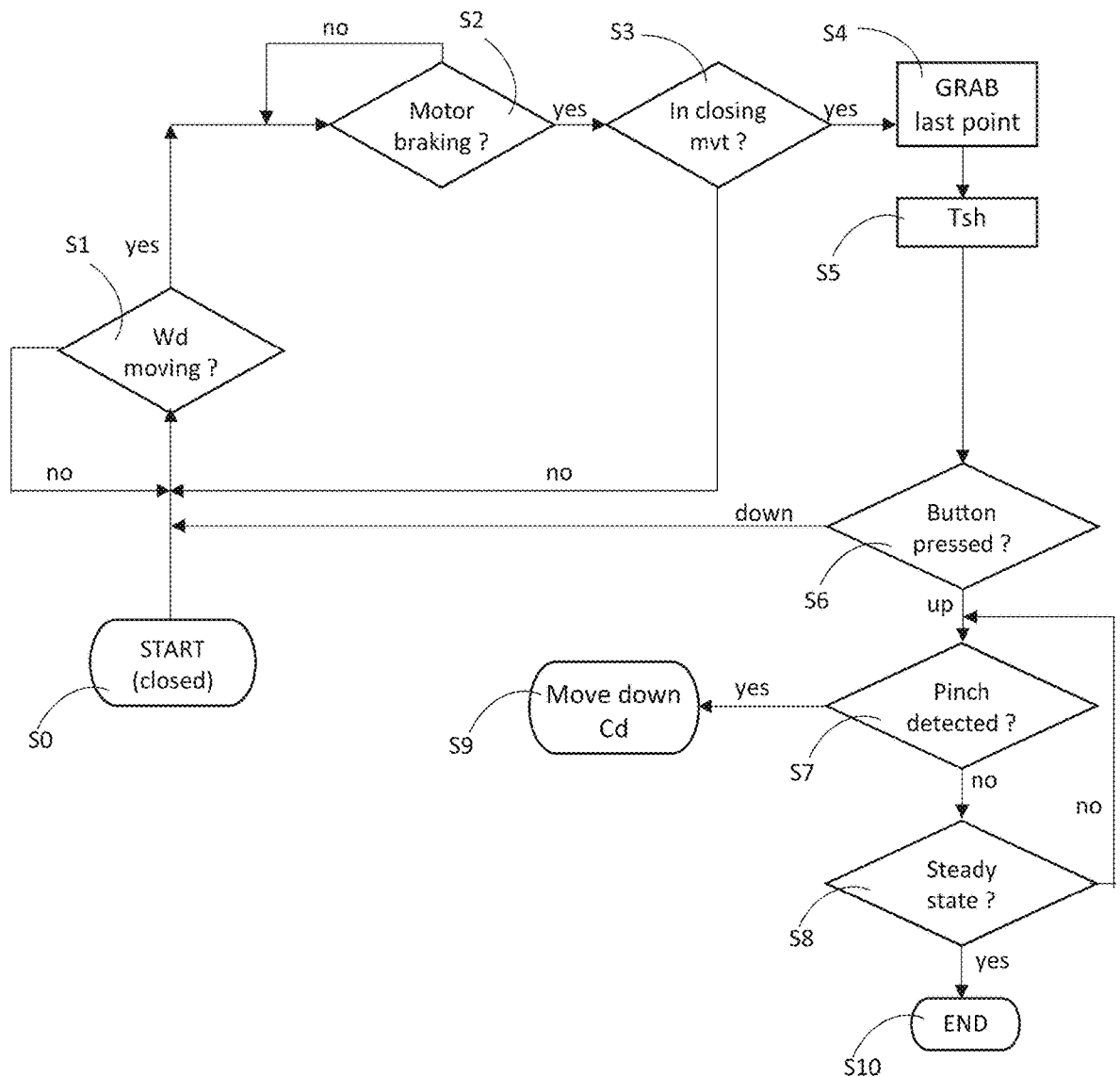
FIG. 6 is a flow chart of the method of pinch detection, according to an Embodiment 1.

FIG. 6 represents schematically the method of pinch detection to detect a pinch at the closing member 1 according to an Embodiment 1.

It is assumed that the member 1 is initially stationary in a completely closed position, in an initial step S0 (FIG. 6). In a variant, the member 1 can be initially stationary in another position, for example a completely open position.

In a first test step S1, the pinch detector 5 determines whether or not the member 1 is moved by the motor 2, i.e. whether or not the motor 2 is running.

As long as the member 1 is not moved (branch 'no' in step S0), the first test step Si is repeated in loop. Typically, the step S1 is repeated as long as the user presses the window command button 6 to move the window 1.

It is assumed that the member 1 is moved, upon reception of a command entered by a user with the window command button 6. In that case (branch 'yes' in step S0), a second test step S2 is executed by the pinch detector 5 to determine whether or not a motor braking information indicating that the motor must brake to stop the member 1 in an intermediate position not completely closed (and also not completely open) has been received by the pinch detector 5. Typically, a motor braking signal and/or information is generated in response to a command, or action, entered by the user, and issued by the control apparatus 4. For example, when the user stops pressing up and releases the window command button 6, this user action generates a signal or information for braking the motor 2 in order to stop the member movement. When the motor braking is thus ordered to stop the member 1, the pinch detector 5 receives a motor braking information either from the control apparatus 4 or directly from the user interface means 6.

The test step S2 is repeated as long as the member 1 is moving and no motor braking information is received (branch 'no' in step S2).

In case that a motor braking information is received (branch 'yes' in step S2), the second test step S2 is immediately followed by a third test step S3 in which the pinch detector 5 determines whether the member 1 has currently a closing movement or an opening movement (when braking is ordered).

In the present embodiment, in case that the member 1 has an opening movement when braking is ordered, the method goes back to the test step S1. Then, the window is stopped and the pinch detector 5 monitors whether or not the member 1 is moved again (step S1).

In case that the member 1 has a closing movement when braking is ordered, the method goes to a step S4 in which the pinch detector 5 determines a reference value of the measured physical quantity of the motor. This reference value is considered as the value of the physical quantity of the motor just before motor braking, when braking is ordered. In the present embodiment, the reference value is a value of the monitored (measured) physical quantity of the motor 2 measured approximately when the braking is ordered. In practice, when braking is ordered (typically when the window command button 6 is released by the user), the pinch detector 5 is immediately informed and requests the last value of the physical quantity of the motor 2 measured by its measuring circuit 3. Concomitantly, when braking is ordered, the control apparatus 4 generates a braking control signal to brake the motor 2 in order to stop the member. Upon reception of this braking control signal, the motor 2 starts braking. When the motor braking has just started, it is assumed that the value of the monitored physical quantity of the motor (current, speed, etc.) is almost the same as just before the motor braking, due to the inertia of motor operation. Indeed, the motor inertia causes it to react slowly. So, the reference value of the physical quantity of the motor, generally measured when the motor has just started braking, is considered as equal or almost equal to the value of the physical quantity of the motor when braking is ordered, just before the motor starts braking. In other words, the reference value of the monitored physical quantity of the motor, presumably grabbed when the motor has just started braking, is considered as the value of the physical quantity before motor braking, more precisely just before braking (when braking is ordered).

In another embodiment, the measured values of the physical quantity of the motor 2 can be stored in a memory, at least temporarily. In that case, when braking is ordered, the pinch detector 5 can request and obtain the stored value measured just before braking, when (or approximately when) braking is ordered, in order to obtain the reference value of the measured physical quantity of the motor.

As previously indicated, the steps S3 and S4 are executed by the pinch detector 5, upon order of braking of the motor 2 as soon as a motor braking information is received by the pinch detector 5.

Then, in a step S5, a threshold value depending on the reference value of the physical quantity of the motor, determined in step S4, is calculated by the pinch detector 5. The calculation of this threshold value can consist in adding to or subtracting from this reference value a margin value of the physical quantity of the motor 2. For example, this margin value is equal to a correction factor multiplied by said reference value of the physical quantity before the motor braking. The correction factor can be between 0,1 and 0,3. The margin value is either added to the reference value or subtracted from the reference value, depending of the kind of monitored physical quantity (as is further explained later in the description of the variants of Embodiment 1), in order to obtain the threshold value. The step S5 of determining the threshold value can be executed later, after step S6.

In the step S6, a test is executed by the pinch detector 5 to determine whether or not closing or opening the window 1 is ordered (typically by pushing up or down the window command button 6 or by a global closing function) in order to open or close the member 1, respectively. The test step S6 is repeated in loop as long as the window 1 is stationary in its intermediate position not completely closed.

When closing of the window 1 is ordered (button 6 pushed up, branch 'up' in step S6), the method goes to a step S7 of pinch detection executed by the pinch detector 5. When opening of the window is ordered (button 6 pushed down, branch 'down' in step S6), the method goes back to step S1. The pinch detector 5 receives the information of closing or opening the window either directly from the user interface means or from the control apparatus 4.

In the step S7 of pinch detection, the pinch detector 5 obtains current values of the measured physical quantity of the motor 2 from the measuring circuit 3 and compares these current values to the threshold value determined in the step S5. The comparison result is then used by the pinch detector 5 to detect the possible occurrence of a pinch at the closing member 1. More precisely, the pinch detector 5 determines whether or not a pinch occurs (i.e., whether or not an obstacle has been placed in the space left when the member 1 was stopped in an intermediate position not completely closed and is squeezed when the member 1 starts moving again in a closing movement) on the basis of the comparison result. The step S7 is executed when the motor starts (i.e., during the motor start-up operation) after being stopped, typically in a transient or semi-steady state of the motor.

In case that no pinch is detected based on the comparison result (branch 'no' in step S7), the detection step S7 is followed by a step S8 in which the pinch detector 5 determines whether or not the motor has reached a steady state. As long as the steady state of the motor is not reached, the steps S7 of pinch detection and S8 are repeated in loop. When the motor has reached a steady state (i.e., when the values of the measured physical quantity are constant or almost constant), the pinch detection ends (step S10). Alternatively, the detection step S7 can have a fixed duration predetermined during a calibration operation. In that case, the step S8 consists in checking whether or not this predetermined duration of the detection step S7 has elapsed or not. The pinch detection S7 is carried out during this predetermined duration and ends as soon as this predetermined duration has elapsed.

In case that a pinch is detected based on the comparison result (branch 'yes' in step S7), upon command of the pinch detector 4, a control signal is generated by a portion of the control apparatus 4 controlling the motor 2 to stop the member 1 and/or reverse its direction of movement (i.e., to change the closing movement into an opening movement) in a step S9.

With reference to FIG. 5, the pinch detector 5 has a first portion 50 that executes the steps S1 to S5, and a second portion 51 that executes the steps S6 and S10.

The first portion 50 identifies a first situation in which the member 1 is being moved in a closing movement but is stopped in an intermediate position not completely closed and, in such a first situation, determines a reference value of the physical quantity of the motor before the motor braking to stop the member 1 and a threshold value depending on this reference value, as previously described.

The second portion 51 identifies a second situation following the first situation in which the member 1 is continued being moved in a closing movement (after being stopped in the first situation), and, in such a second situation, to compare current measured values of the physical quantity of the motor 2 to the threshold value determined by the first portion in order to detect the occurrence of a pinch at the closing member 1 based on the comparison result. The second portion 51 compares the current values of the measured physical quantity to the threshold value in a transient or semi-steady state of the motor 2 during the motor start-up operation.

The pinch detector 5 can be a functional element that is implemented by the controlling apparatus 4 executing a program for pinch detection. Therefore, the present disclosure also concerns a non-transitory computer readable medium including program instructions which, when executed by a processor, cause the processor to execute the method for pinch detection.

First variant of the Embodiment 1

In a first variant implementing the Embodiment 1, the monitored physical quantity of the motor is a motor current, such as an armature current flowing through an armature winding of the motor. In that case, the pinch detector 5 starts detection of a pinch in step S7 immediately after the closing of the member 1 is ordered, when the motor starts to move the member 1 in a closing movement.

Figures 7A, 7B, 7C:
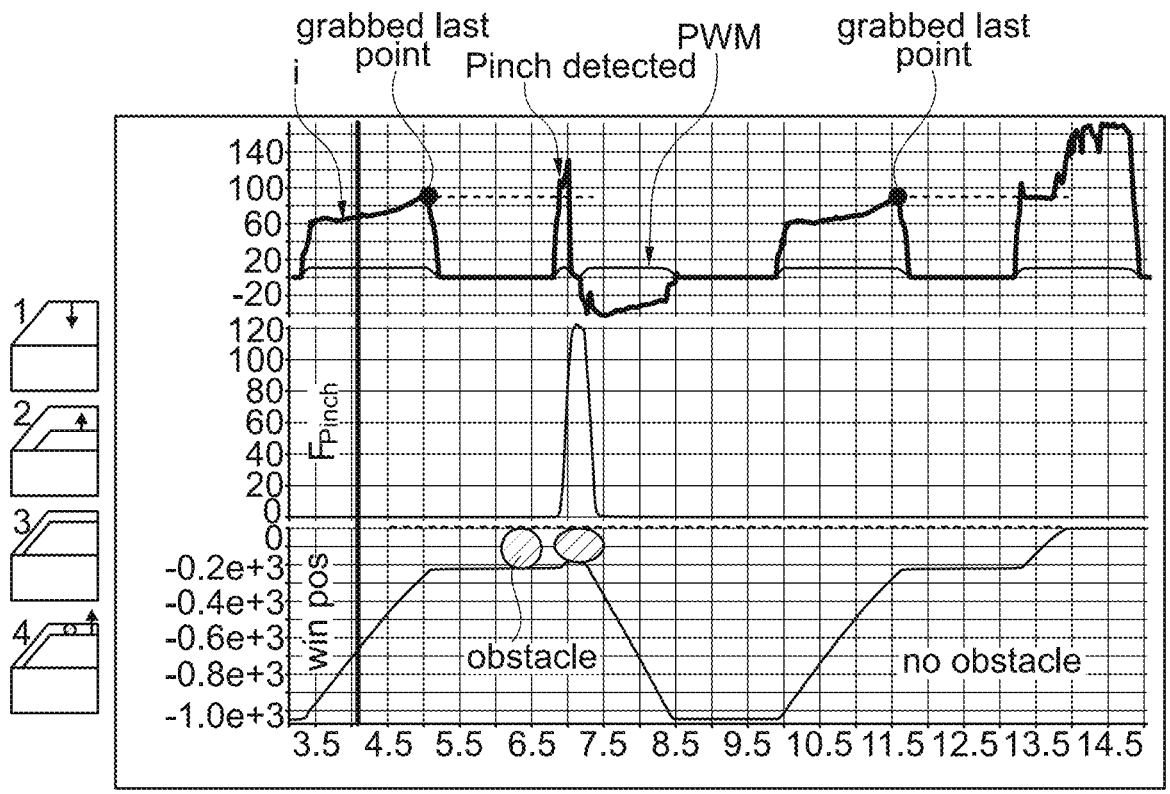
FIGS. 7a, 7b and 7c illustrate the method of pinch detection in a scenario of closing a window, with and without obstacle, according a first variant of Embodiment 1, and show the evolution over time of the motor armature current i, pinch force FP and window position win pos.

The operation of pinch detection, according to the first exemplary implementation of the Embodiment 1, is illustrated in detail in FIGS. 7a to 7c. The upper graph represents the motor armature current i over time. The middle graph represents the pinch force $F_P$ over time. Pinch force $F_P$ represented in FIG. 7 is measured by a pinch meter that is an external apparatus only used for development and validation of the present algorithm of pinch detection. In FIG. 7a, a first member movement scenario (here a window movement) is illustrated in four successive stages explained below:

stage (1): the window that is initially completely closed is completely opened;

stage (2): the window is then moved up, in a first closing movement, from its open position to an intermediate position not completely closed, stage (3): the window is stopped and stationary in this intermediate position not completely closed, stage (4): an obstacle "O" having a given stiffness is placed in the left space between the member 1 and the member frame, and the window starts closing again, in a second closing movement.

In the example of FIGS. 7b and 7c, the obstacle stiffness is 65 N/mm.

In FIG. 7b, the three graphs represent the evolution over time t of the motor armature current "i", the pinch force "$F_P$" (or "$F_{Pinch}$") and the window position "win pos", in the first scenario, during stages (2), (3) and (4).

In FIG. 7c, the three graphs represent the evolution over time t of the same physical values (motor armature current "i", the pinch force "$F_P$" and the window position "win_pos") in a second scenario, similar to the first scenario but without obstacle.

In each of the first and second scenario, the pinch detection starts when closing the window starts in stage (3).

If the window 1 closes and the user decides to stop the window 1 before it closes completely, the pinch detector 5, immediately after being informed of the motor braking, grabs a last point of the measured armature current value. The grabbed last point is a reference value of the current representative of the current before motor braking. It is used directly in pinch detection, in transient or semi-steady state of the motor as soon as the window 1 closing starts again (in the second closing movement in stage (4)). As previously described, pinch detection relies on comparing the current values of the motor armature current, measured during the motor start-up operation (in transient or semi-steady state of the motor), with a threshold value depending on the previously grabbed last point value (or reference value). Exceeding the previously grabbed last point value by a certain level results in pinch detection, as previously described in Embodiment 1.

Figures 8A, 8B:
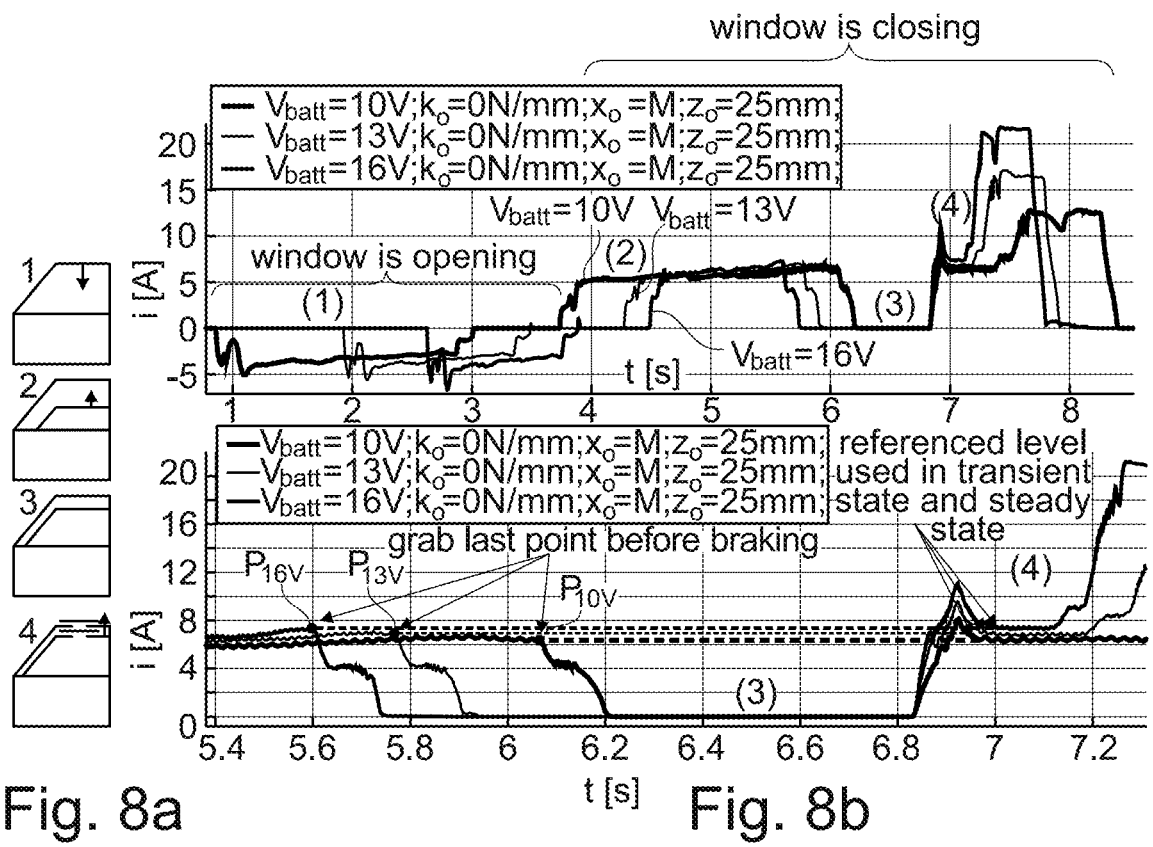
FIGS. 8a, 8b illustrate the evolution over time of the motor armature current in a scenario of closing the window at various battery voltages, without any obstacle, in the first variant of Embodiment 1.
Figure 11A:
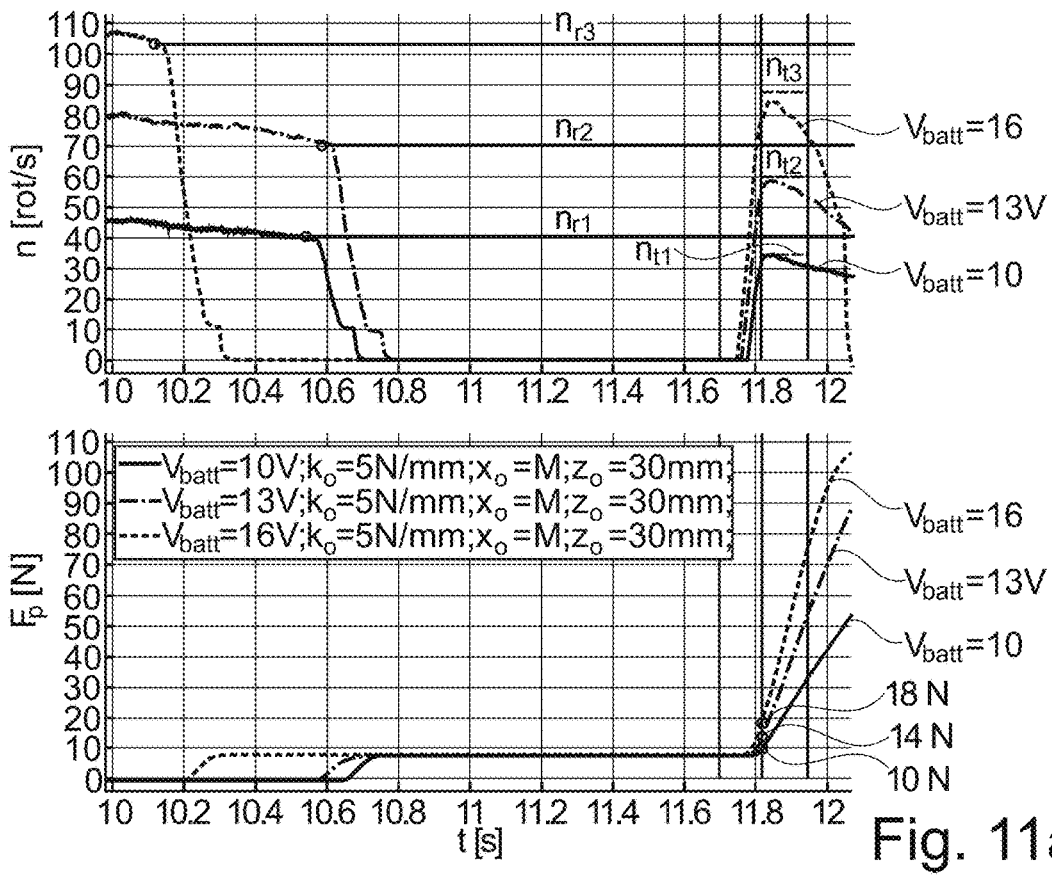
FIGS. 11a to 11d illustrate the method of pinch detection in a scenario of closing a window, in the second variant of Embodiment 1, and represent the evolution over time of the motor speed and pinch force, in various external conditions.
Figure 11B:
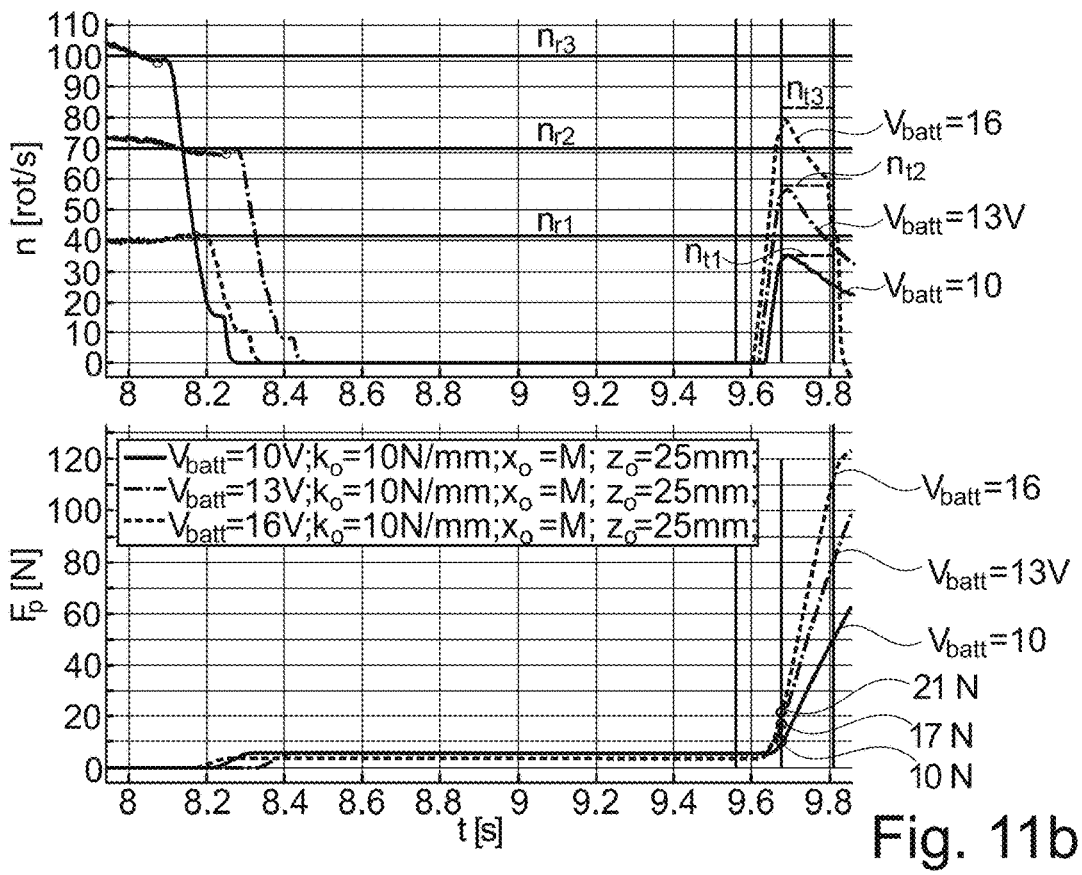
Figure 11C:
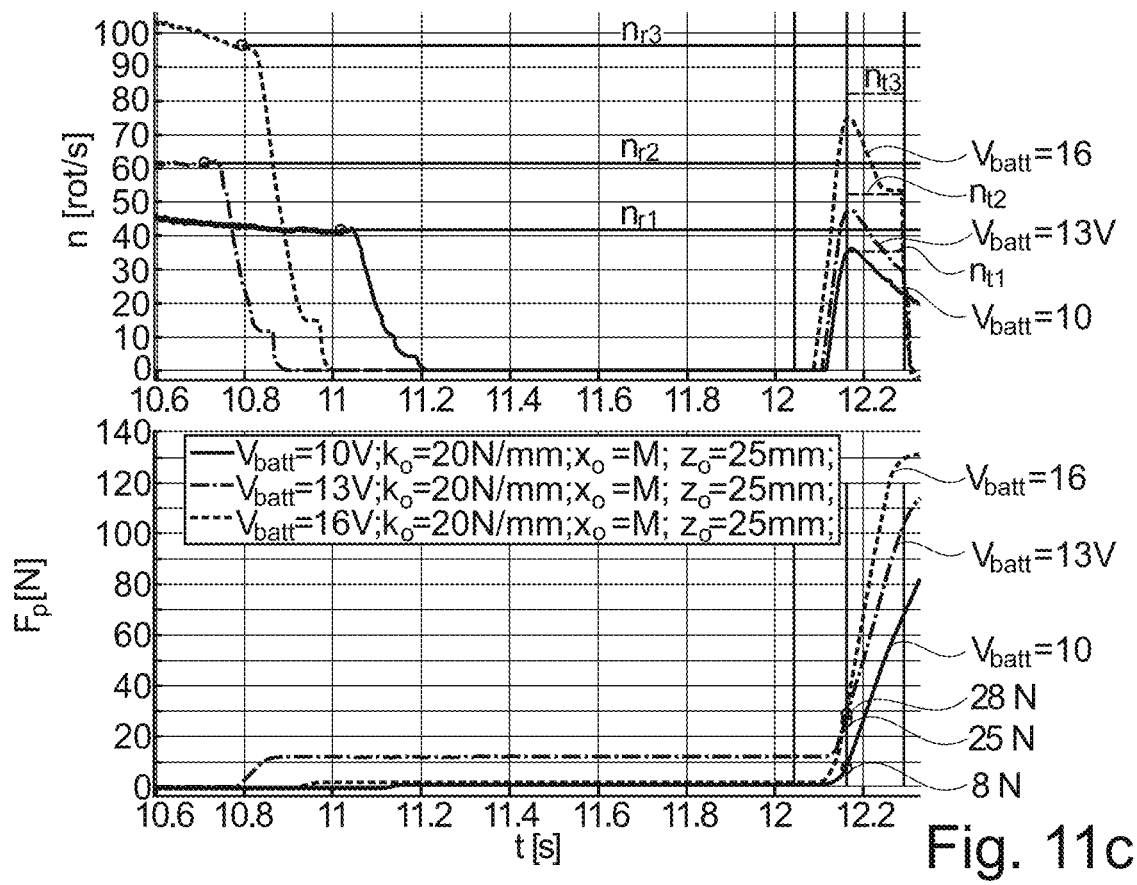
Figure 11D:
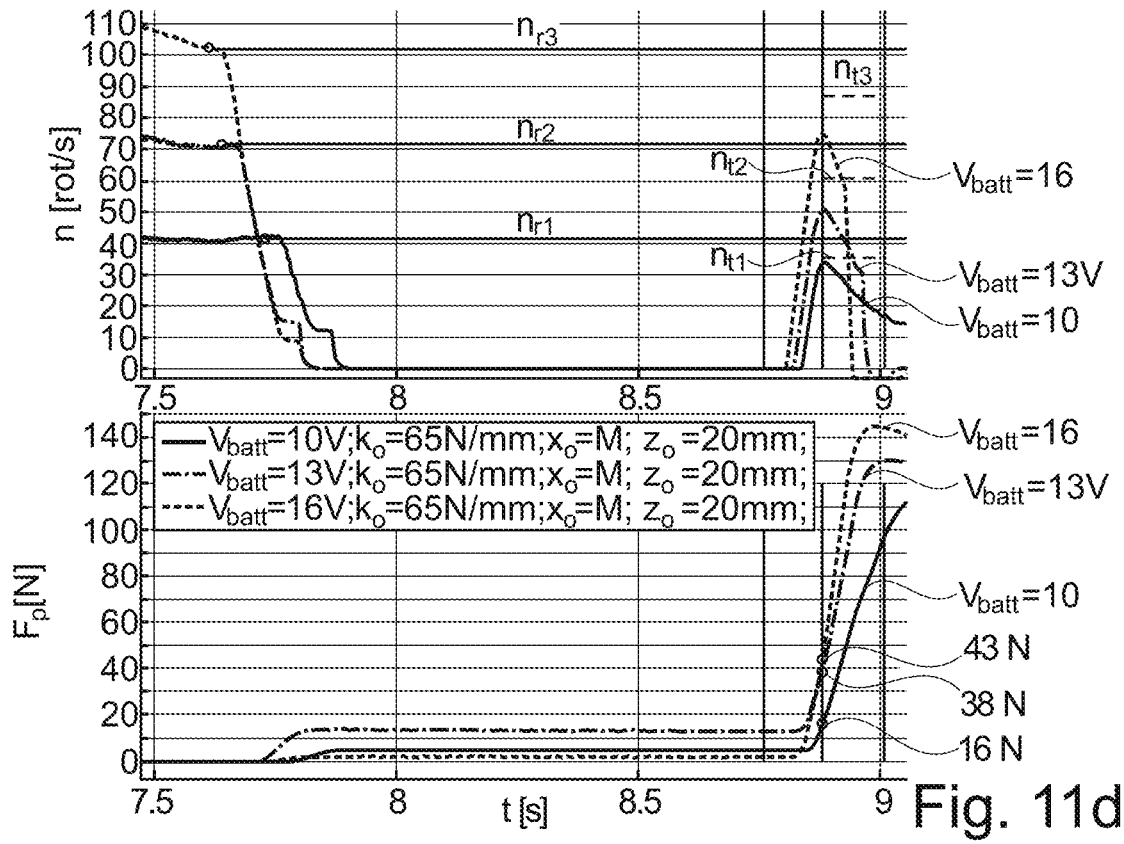

FIG. 8a shows a third window movement scenario, similar to the first scenario in FIG. 7a but without obstacle ($k_O$=0 N/mm). FIG. 8b shows the evolution over time of the motor armature current for various battery voltages of 10, 13 and 16 V, in this third window movement scenario. When braking is ordered (as soon as the pinch detector 5 receives the motor braking information), the pinch detector 5 grabs (obtains) last point of the measured armature current value, represented by points $P_{16V}$ for $V_{batt}$=16 V, $P_{13V}$ for $V_{batt}$=13 V and $P_{10V}$ for $V_{batt}$=10 V. The grabbed last point is used directly in pinch detection in transient or semi-steady state as soon as the window closing starts. In FIG. 8b, the upper graph shows stages (1) to (4) of the window movement scenario, and the lower graph zooms in stages (2) to (4). The threshold values (not represented in FIG. 8b) depend on the respective reference levels defined by the grabbed last points (represented by dotted lines in FIG. 8b) and are calibrated to be a little higher than the respective current peaks occurring when the motor starts.

The present disclosure allows to predict the current level very well when the member 1 closes again after being stopped in an intermediate position not completely closed. This ensures an effective detection of any obstacle placed in the window gap (space) and compressed immediately after the motor starts (stage (4) in FIG. 7a).

The first variant of Embodiment 1 works with a motor equipped a with motor armature current measuring circuit and is efficient and reliable in various conditions of temperature, battery voltage, obstacle stiffness and obstacle position in the space left. It meets the requirements of the automotive industry.

Second variant of the Embodiment 1

In a second variant implementing the Embodiment 1, the monitored physical quantity of the motor is a motor speed, for example the motor armature shaft rotational speed "n". For example, the member 1 is a window in a vehicle.

The algorithm (method) of pinch detection is depicted in FIG. 9 for two cases. The first case ('$n_0$' and '$F_{P0}$') is without obstacle and the second case '$n_1$' ('$n_1$' and '$F_{P1}$') is with an obstacle having a stiffness $k_o$=5 N/mm.

In the two illustrated cases, when the window closes, the user decides to stop the window before it closes completely. The pinch detector 5, upon reception of the motor braking information about the start of the motor braking, immediately grabs (obtains) last point of the measured armature shaft speed value, that defines a reference value (or a reference level) of the motor speed $n_r$ before braking, as previously explained (in the two cases, with and without obstacle, the measured reference levels $n_r$ are the same, or almost the same). This grabbed last point is generally measured when the motor has just started braking but can be considered as the motor speed just before motor braking, due to the motor operation inertia. It is then used in pinch detection in transient or semi-steady state of the motor 2 as soon as the window upward movement starts.

The pinch detection relies on comparing the current values (points) of the motor speed n measured during the motor start-up operation (in transient or semi-steady state of the motor) with a speed threshold $n_t$ depending on the grabbed last point $n_r$ (or reference value of the motor speed before braking).

In the second variant of Embodiment 1, the pinch detection is divided into two periods of time: period A in which the motor starts and its speed increases; period B in which the motor is in a semi-steady state.

The period A corresponds to a transient state of the motor when the motor speed increases rapidly. The period B corresponds to a semi-steady state of the motor, that is a state (or a period of time) between the period A of rapid motor speed increase and the steady state of the motor.

The respective durations of periods A and B are fixed parameters, determined during a calibration operation and set in the pinch detector 5 before use.

The duration of period A is closely related to the motor start-up strategy (e.g., hard start or soft start) and the inertia of the system set in motion by the motor. FIGS. 10a and 10b show two different motor start-up strategies a) and b). FIG. 10a represents the so-called hard start. The motor 2 starts immediately after a motor start command. The motor being supplied in power by a PWM signal, the rise time of the PWM duty cycle goes from 0 to 1 instantly. This situation is similar to the situation which occurs when the motor is controlled directly by relays. FIG. 10b represents the so-called soft start for which the rise time of the PWM duty cycle is 100 ms in the given example. The duration of the period A is longer in the strategy b) than in the strategy a).

For the different motor start-up strategies, in particular for the two strategies a) and b), a same time duration of period B, determined in calibration, can be applied.

The present pinch detection works efficiently for various motor start-up strategies. It also works for motors not equipped with PWM controllers.

In period A, the pinch detection algorithm is not executed.

In period B, the pinch detection algorithm (method) is executed.

The calibration process to determine the respective durations of periods A and B can be performed by carrying out experiments of the pinch detection algorithm for the extreme values of the obstacle stiffness, for example 65 N/mm (maximal stiffness) and 0 N/mm (minimal stiffness, no obstacle), and for extreme voltage values $V_{batt}$ of a supply battery, for example 10 V (very slow movement of the member 1) and 16 V (maximum speed movement of the member 1). The object (obstacle) can be a spring having a known stiffness. The two following cases are the most interesting for calibration:

1) the lowest speed ($V_{batt}$=10 V) and the object (obstacle) with the lowest stiffness (spring stiffness $k_O$=5 N/mm);
2) the highest speed ($V_{batt}$=16 V) and the object with the highest stiffness (spring stiffness $k_o$=65 N/mm).

In case 1), the pinch detection algorithm has the most time for detection, but the dynamic of the analyzed signal is low, which hinders proper detection. In case 2), the pinch detection algorithm has the least time for detection and reaction, but on the other hand, the dynamic of the analyzed signal is high, which improve proper detection.

The durations of the periods A and B are determined by experiments in such a manner that the detection algorithm correctly detects the pinch for the limit values (max, min).

During calibration, the pinch detection algorithm is tested using a special device called a pinch meter. It gives the possibility of testing by simulating objects of different flexibility. This is achieved by selecting a spring with the appropriate stiffness in the pinch meter. The calibration can be performed before production of the detector pinch.

A speed threshold value $n_t$ can be calculated according to the following equations:

$$n_t = n_r - n_m \quad (1)$$

$$n_m = K_n n_r \quad (2)$$

where
$K_n$ is the correction (here reduction) factor;
$n_r$ is the reference speed value (last point of the measured speed value);
$n_m$ is a margin speed value.

In the given example, the value of the correction factor is $K_n$=0.15.

In FIG. 9, in the scenario without any obstacle, the currently measured motor speed value $n_0$ is not below the speed threshold $n_t$ in period B. Consequently, no pinch is detected. The window continues its upward movement until it is fully closed. In the scenario with an obstacle, the currently measured motor speed value $n_1$ is below the speed threshold $n_t$ in period B. As a result, the occurrence of a pinch is detected. When the currently measured motor speed n is below speed threshold $n_t$ during the period B during the motor start-up operation, a pinch is detected.

FIGS. 11a to 11d illustrate stages (2) to (4) in a member movement scenario similar to that of FIG. 7a, for various operating conditions related to the battery voltage $V_{batt}$, the vertical position $z_o$ of the obstacle (with respect to the horizontal upper window frame) and the obstacle stiffness $k_O$. In each FIGS. 11a to 11d, the motor armature shaft speed n over time is shown in the upper part, and the pinch force $F_p$ over time is shown in the lower part. The solid lines indicate the reference levels (last grabbed points of the measured speed before braking) referenced as $n_{r1}$, $n_{r2}$ and $n_{r3}$ for battery voltages $V_{batt}$ of 10, 13 and 16 V, respectively. The dashed lines indicate the speed thresholds $n_{t1}$, $n_{t2}$ and $n_{t3}$ for battery voltages $V_{batt}$ of 10, 13 and 16 V, respectively. In addition, the numerical pinch force values at which the squeezed (compressed) object is detected are given. The highest detected pinch force is $F_p=43$ N and relates to the most critical scenario.

These experiments show that the pinch detection method of the present disclosure gives a sufficient margin to prevent exceeding the acceptable and/or allowable pinch force limit, set to 100 N by standards. These results show the correctness and effectiveness of the disclosed pinch detection method.

Figure 12:
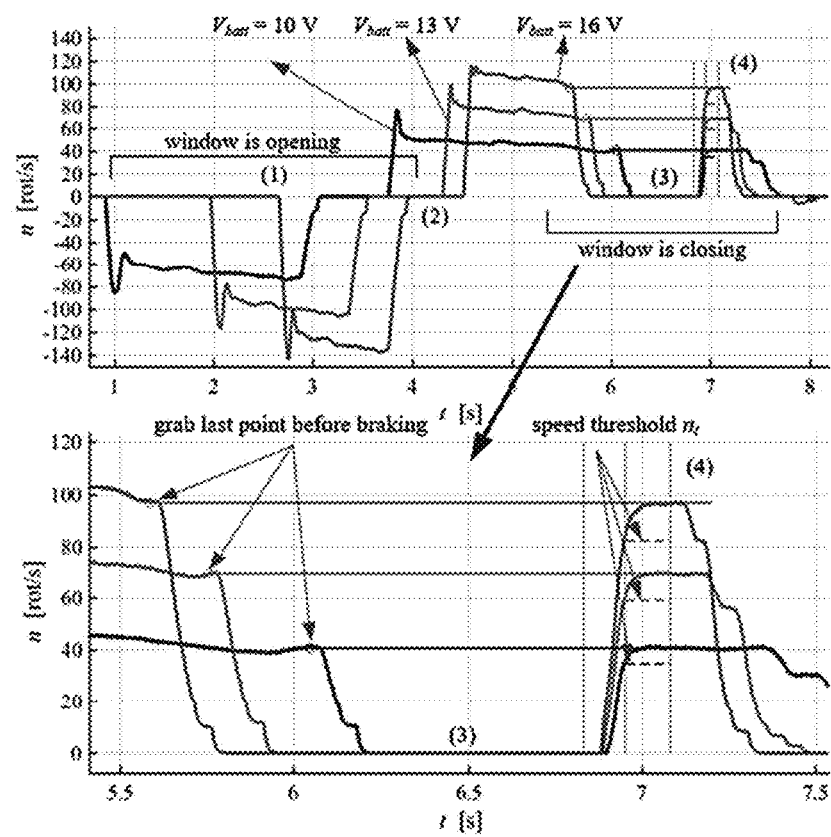
FIG. 12 illustrates the evolution of the motor speed over time in a scenario of closing the window at various battery voltages without obstacle, in the second variant of Embodiment 1.

In addition, FIG. 12 illustrates the case of opening and then closing the member (e.g. a window) with different battery voltages without obstacle. The member movement scenario is close to the first scenario described in the first variant of Embodiment 1: it includes four stages (1) to (4) but differs in that no obstacle is placed in the left space in stages (3) and (4). The upper graph represents the evolution over time of the motor speed during the entire movement. The lower graph represents the motor speed stages (3) and (4). These experiments show that: without obstacle, no false pinch detection occurs, and obtaining a reference value of the measured motor speed, when motor braking is ordered to stop the member, typically by grabbing the last measured speed point value before braking or most probably when the motor has just started braking, allows to predict properly the motor speed in steady-state after restart of the upward movement The second variant of Embodiment 1 works with a motor equipped with a speed or position measuring circuit. No current measurement is needed. It also works properly with DC motor drivers based on relays and not equipped with semiconductors and/or PWM controller. It is dedicated for motors equipped with Hall sensors (for example arranged in the measuring circuit 3 in FIG. 5). Hall sensors can be used to directly measure the position of motor shaft or to measure indirectly the motor shaft speed. It meets the requirements of the automotive industry.

The present disclosure allows to achieve pinch detection at a closing member during a motor start-up operation, when the motor starts again after the member has been stopped in an intermediate position not completely closed, during an upward movement of the member. The pinch detection is based on recorded data (motor current and/or motor speed, etc.) when the motor brakes, that allows to determine a reference value of the recorded data, then used to detect the occurrence of a pinch. This reference value is updated every time the member stops.

The present method for pinch detection is simple, fast and can be easily implemented. It is also self-adapting and robust with respect to external conditions such as battery voltage, obstacle stiffness, obstacle position. It meets the requirements of the automotive industry.

What is claimed is:

1. A pinch detector comprising a processor that is configured to detect a pinch at a closing member actuated by a motor, the processor further configured to:
   receive successive measured values of a physical quantity of the motor from a measuring circuit;
   in a first situation in which the member is being closed in a first closing movement but is stopped in an intermediate position, obtain a reference value of the physical quantity of the motor, the reference value representing a measured value of the physical quantity of the motor just before motor braking, the intermediate position not being a completely closed position;
   determine a threshold value by adding to or by subtracting from the reference value a margin value of the physical quantity of the motor; and
   in a second situation following the first situation and in which the member is moved from the intermediate position in a second closing movement, compare current measured values of the physical quantity of the motor to the threshold value to detect the pinch at the closing member.

2. The pinch detector of claim 1, wherein the processor is further configured to compare the current measured values of the physical quantity to the threshold value during a motor start-up operation.

3. The pinch detector of claim 1, wherein the processor is further configured to obtain the reference value of the physical quantity of the motor by requesting a last value of the physical quantity upon reception of a braking information when the motor has just started braking.

4. The pinch detector according of claim 1, wherein the a margin value is equal to a correction factor multiplied by the reference value.

5. The pinch detector of claim 4, wherein the correction factor has a value between 0.1 and 0.3.

6. The pinch detector of claim 1, wherein:
   the physical quantity of the motor is a motor current; and
   the processor is further configured to start detection of a pinch immediately when the motor starts after being stopped.

7. The pinch detector of claim 1, wherein:
   the physical quantity of the motor is a motor speed; and
   the processor is further configured to start detection of a pinch after a predetermined time duration from a motor starting time point, the predetermined time duration corresponding to a first period of time in the motor starting during which the motor speed increases.

8. A system that comprises:
   a member configured to open or close;
   a motor configured to activate the member;
   a measuring circuit configured to measure a physical quantity of the motor;
   a pitch detector comprising a processor configured to:
      in a first situation in which the member is being closed by the motor in a first closing movement but is stopped in an intermediate position, obtain a reference value of the physical quantity of the motor, the reference value representing a measured value of the physical quantity of the motor just before motor braking, the intermediate position not being a completely closed position;
      determine a threshold value by adding to or by subtracting from the reference value a margin value of the physical quantity of the motor; and
      in a second situation following the first situation and in which the member is moved from the intermediate position in a second closing movement, compare current measured values of the physical quantity of the motor to the threshold value to detect a pinch at the closing member; and
   a control apparatus configured to generate a control signal to stop movement of the member or reverse a direction of the movement of the member in response to detecting the pinch.

9. The system of claim 8, wherein the processor is further configured to compare the current measured values of the physical quantity to the threshold value during a motor start-up operation.

10. The system of claim 8, wherein the processor is further configured to obtain the reference value of the physical quantity of the motor by requesting a last value of the physical quantity upon reception of a braking information when the motor has just started braking.

11. The system of claim 8, wherein the margin value is equal to a correction factor multiplied by the reference value.

12. The system of claim 11, wherein the correction factor has a value between 0.1 and 0.3.

13. The system of claim 8, wherein:
the physical quantity of the motor is a motor current; and
the processor is further configured to start detection of a pinch immediately when the motor starts after being stopped.

14. The system of claim 8, wherein:
the physical quantity of the motor is a motor speed; and
the processor is further configured to start detection of a pinch after a predetermined time duration from a motor starting time point, the predetermined time duration corresponding to a first period of time in the motor starting during which the motor speed increases.

15. The system of claim 8, wherein the system is included in a vehicle.

16. A method comprising:
in a first situation in which a member is being closed by a motor in a first closing movement but is stopped in an intermediate position, obtaining a reference value of a physical quantity of the motor, the reference value representing a measured value of the physical quantity of the motor just before motor braking and measured by a measuring circuit, the intermediate position not being a completely closed position;
determining a threshold value by adding to or by subtracting from the reference value a margin value of the physical quantity of the motor; and
in a second situation following the first situation and in which the member is moved from the intermediate position in a second closing movement, comparing current measured values of the physical quantity of the motor to the threshold value to detect a pinch at the closing member.

17. The method of claim 16, wherein the current measured values of the physical quantity are compared to the threshold value during a motor start-up operation.

18. The method of claim 16, wherein the reference value of the physical quantity of the motor is obtained by requesting a last value of the physical quantity upon reception of a braking information when the motor has just started braking.

19. The method of claim 16, wherein the margin value is equal to a correction factor multiplied by the reference value.

20. The method of claim 19, wherein the correction factor is set to a value between 0.1 and 0.3.

* * * * *